United States Patent [19]

Cohen

[11] Patent Number: 5,203,503
[45] Date of Patent: Apr. 20, 1993

[54] DRIP IRRIGATION LINES

[75] Inventor: Amir Cohen, Yuvalim, Israel

[73] Assignee: Agroteam Consultants Ltd., Migdal Ha'emek, Israel

[21] Appl. No.: 647,099

[22] Filed: Jan. 29, 1991

[30] Foreign Application Priority Data

Feb. 2, 1990 [IL] Israel ............................. 93255

[51] Int. Cl.[5] ............................................ B05B 15/00
[52] U.S. Cl. ................................... 239/1; 239/542
[58] Field of Search .......................... 239/542, 1

[56] References Cited

U.S. PATENT DOCUMENTS

| 309,162 | 3/1989 | Hardie | 239/542 |
| 3,870,236 | 3/1975 | Sahagan-Barragan | 239/542 |
| 4,023,595 | 5/1977 | Zakay | 239/542 X |
| 4,177,946 | 12/1979 | Sahagan-Barragan | 239/542 X |
| 4,728,042 | 3/1988 | Gorney et al. | 239/542 |
| 4,958,772 | 9/1990 | Fabbri et al. | 239/542 |

Primary Examiner—Andres Kashnikow
Assistant Examiner—Kevin Weldon
Attorney, Agent, or Firm—Benjamin J. Barish

[57] ABSTRACT

A drip irrigation line includes a continuous tube having a plurality of flow-reducer elements each including a strip formed with an inlet chamber at one end having an inlet opening, an outlet chamber at the opposite end having an outlet opening, a flow-reducer path between the two chambers, and a connecting passageway between, and axially spaced from, the flow-reducer path and the outlet chamber. At least the portion of the strip forming the connecting passageway is of elastomeric material.

17 Claims, 4 Drawing Sheets

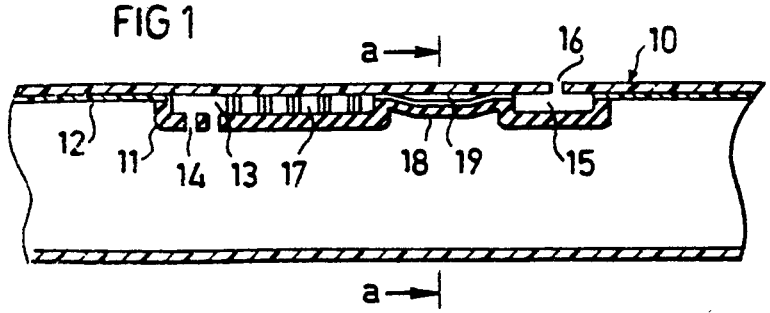
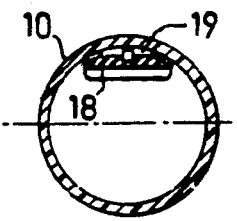
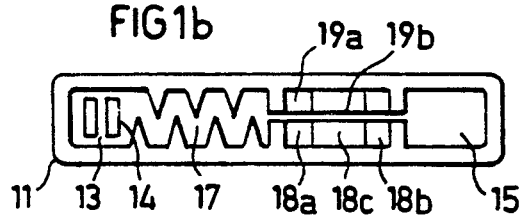
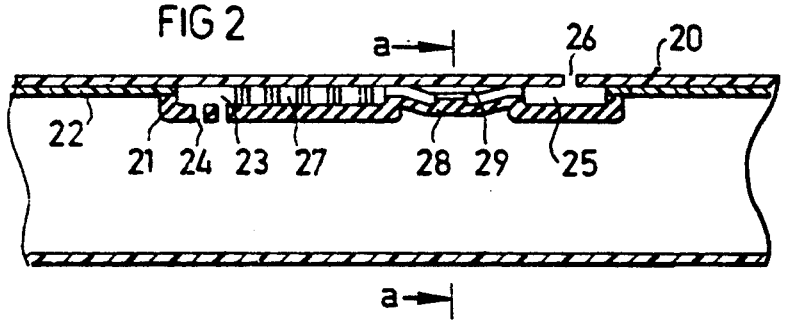
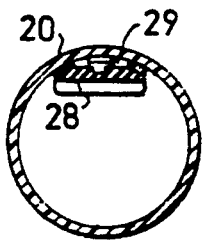
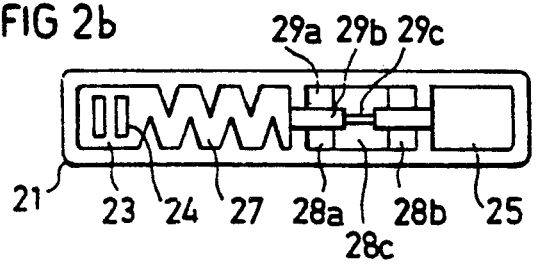

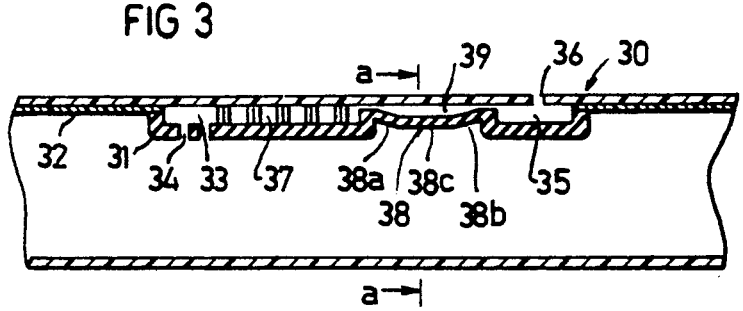
FIG 3
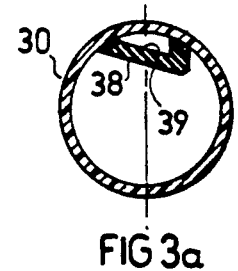
FIG 3a
FIG 3b
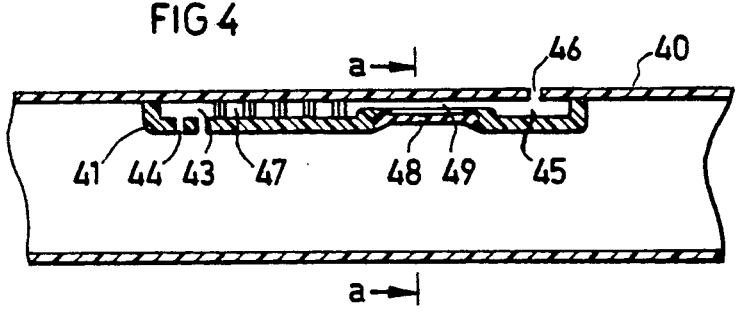
FIG 4
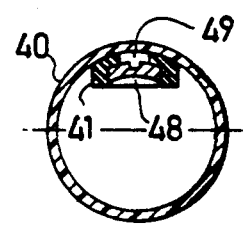
FIG 4a
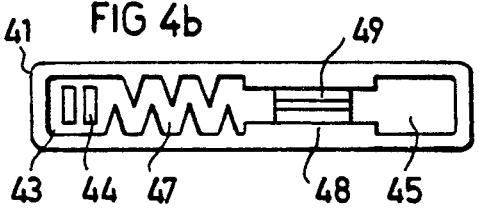
FIG 4b
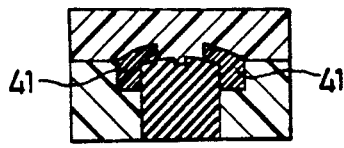
FIG 4c
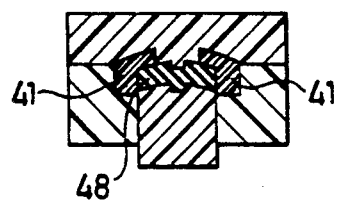
FIG 4d

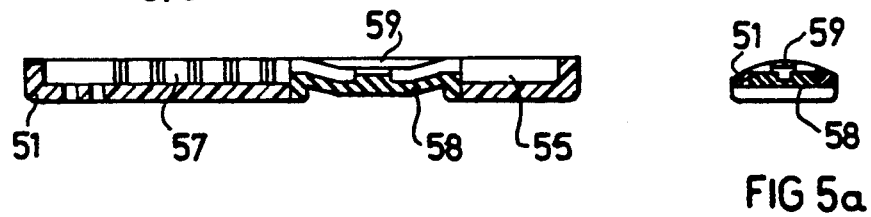
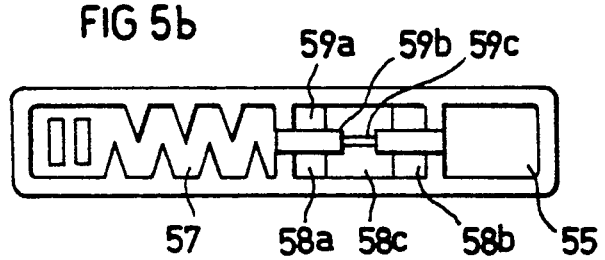
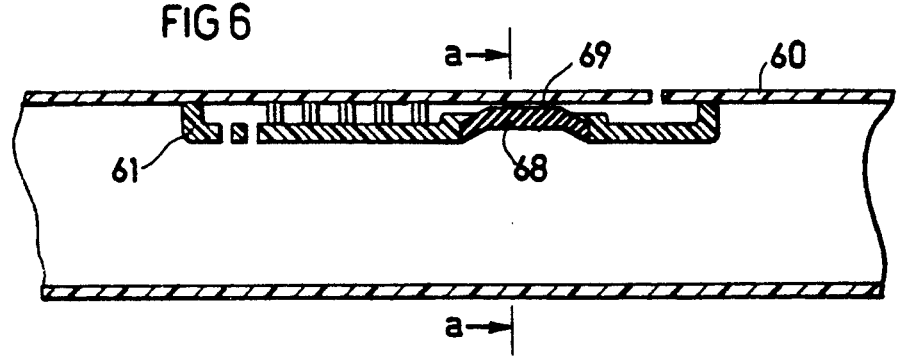
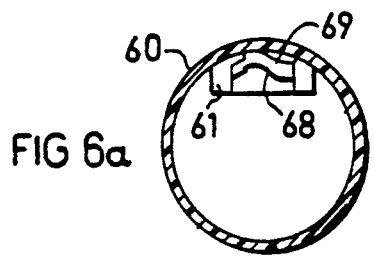

DRIP IRRIGATION LINES

FIELD AND BACKGROUND OF THE INVENTION

The present invention relates to drip irrigation lines, and particularly to drip irrigation lines of the type including a continuous tube having a plurality of flow-reducer elements spaced longitudinally of the tube.

Drip irrigation lines of the foregoing type are gaining widespread use because of their efficiency in the delivery of the irrigating water directly to the plant roots, and their substantial savings in the irrigation water required. Examples of drip irrigation lines that have been previously developed are described in U.S. Pat. Nos. 3,896,999, 4,307,841, 4,519,546, 4,687,143, 4,702,787 and 4,728,042.

OBJECTS AND BRIEF SUMMARY OF THE INVENTION

An object of the present invention is to provide a novel drip irrigation line which is self-regulating under varying line pressures, and which may be produced in volume and at relatively low cost.

According to the present invention, there is provided a drip irrigation line comprising a continuous tube having a plurality of flow-reducer elements spaced longitudinally of the tube, each of the flow-reducer elements comprising a strip formed with an inlet chamber of a predetermined depth at one end having an inlet opening, an outlet chamber of said predetermined depth at the opposite end having an outlet opening, and a flow-reducer path between the two chambers; the strip of each flow-reducer element being further formed with a connecting passageway, of a depth less than said predetermined depth, between, and axially spaced from, the flow-reducer path and the outlet chambers, at least the portion of the strip forming the connecting passageway being of elastomeric material.

The differential pressure on the opposite faces of the elastomeric material imparts a flow-regulation characteristic to regulate the output flow under varying line pressures. Thus, relatively high line pressures tending to increase the flow output rate, increases the deformation of the elastomeric material at the connecting passageway which decreases the cross-sectional area of that passageway, thereby reducing the flow rate. On the other hand, relatively low line pressures, tending to reduce the output flow rate, decreases the deformation of the elastomeric material at the connecting passageway, which increases the cross-sectional area of the passageway, thereby increasing the flow rate.

Several embodiments of the invention are described below for purposes of example. In some described embodiments, each strip is of elastomeric material for the complete length of the flow-reducer path and of the connecting passageway, which thereby enables the flow-reducer elements to be produced by a one-shot moulding operation. In other described embodiments, each strip is of elastomeric material only for the length of the connecting passageway, which enables the flow-reducer elements to be produced in a two-shot moulding operation but using a single mould. In both cases, since only a single mould and a single moulding operation are required to produce the flow-reducer elements, the drip irrigation lines incorporating such elements may be produced in volume and at relatively low cost.

According to further features in the various embodiments of the invention described below, the connecting passageway may include a wide groove of a depth less than that of the inlet and outlet chamber and a narrow groove of a depth greater than that of the wide groove but less than that of the inlet and outlet chambers extending through part of the wide groove, or a relatively wide groove varying in depth from one edge to the opposite edge.

According to further features in some of the preferred embodiments of the invention described below, the flow-reducer elements are separate discrete strips bonded at spaced intervals to a continuous, elongated, flexible element which is in turn bonded to one surface of the tube. In such described embodiments, the continuous, elongated, flexible element is of higher mechanical strength than that of the flow-reducer elements. This enhances the mechanical strength of the drip irrigation line, and thereby permits the tube to be made of thinner material, enabling a substantial saving in the cost of the line. Also, since the flow-reducer elements are supported by the continuous, elongated, flexible element, the flow-reducer elements need not have the rigidity that would otherwise be required when they are individually fed to the tube extruder, thereby enabling a savings in the costs of this material, and also decreasing the possibility of tearing or collapsing the extruded tube when rolled in the form of a reel.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a sectional view illustrating one form of drip irrigation line constructed in accordance with the invention, FIG. 1a being a sectional view along line a—a of FIG. 1, and FIG. 1b being a top view of the flow-reducer element;

FIGS. 2, 2a and 2b are corresponding views of another drip irrigation line constructed in accordance with the present invention;

FIGS. 3 and 3a are views corresponding to FIGS. 1a and 1b of another drip irrigation line constructed in accordance with the invention, and FIG. 3b is a view corresponding to FIG. 3a but illustrating a modification;

FIGS. 4, 4a and 4b are views corresponding to FIGS. 1, 1a and 1b of another drip irrigation line constructed in accordance with the present invention;

FIGS. 4c and 4d are enlarged fragmentary views illustrating the manner of producing each of the flow-reducer elements in the construction illustrated in FIG. 4 by a two-shot moulding method utilizing a single mould;

FIGS. 5, 5a and 5b are views corresponding to those of FIGS. 1, 1a and 1b of another construction in accordance with the invention but showing only the flow-reducer element; and FIGS. 6 and 6a are views corresponding to FIGS. 1 and 1a of a still further form of drip irrigation line constructed in accordance with the invention.

DESCRIPTION OF PREFERRED EMBODIMENTS

The FIG. 1 Embodiment

Figure 2C:
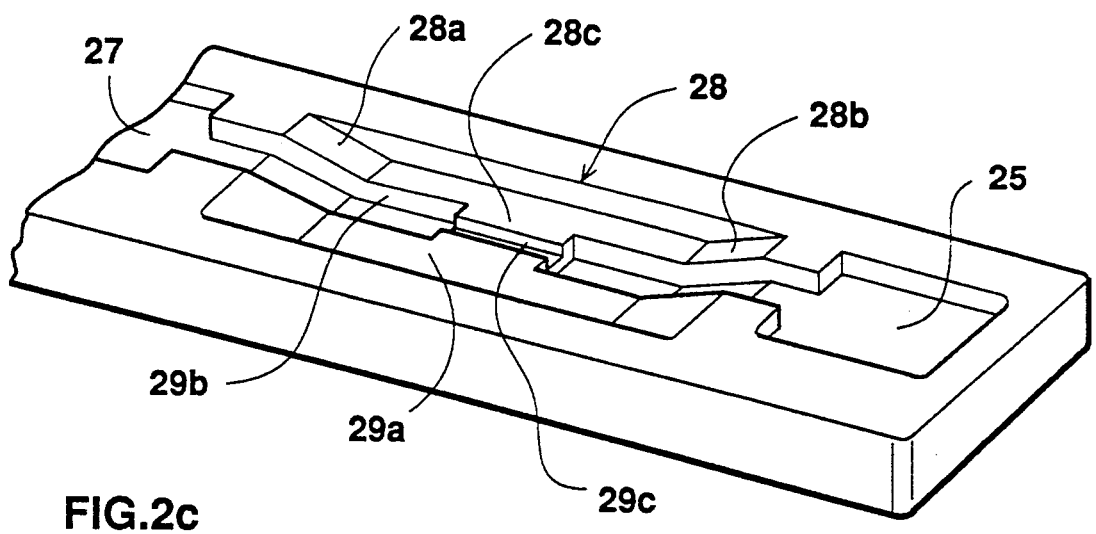
FIG. 2c is a three-dimensional view illustrating a portion of the flow-reducer element of FIGS. 2, 2a and 2b.

FIGS. 1, 1a and 1b illustrate a drip irrigation line comprising a continuous tube 10 having a plurality of flow-reducer elements, one being shown at 11, spaced longitudinally of the tube. The flow-reducer elements 11 are separate, discrete strips bonded at spaced intervals to a continuous, elongated flexible strip 12. Strip 12 in turn is bonded to the inner face of tube 10.

Preferably, a plurality of the flow-reducer elements 11 are first injection moulded onto the continuous strip 12; and then tube 10 is extruded while concurrently feeding and bonding the continuous strip 12, and its flow-reducer elements 11, to the inner face of the extruded tube, the outlet openings being subsequently formed through the tube. The continuous strip 12 is preferably of plastic material having higher mechanical strength than the material of the flow-reducer elements 11, thereby enhancing the strength of the produced drip irrigation line while permitting both the tube 10 and the flow-reducer elements 11 to be made of thinner material. This method is also much more easily automated and requires simpler apparatus than the previously-used methods, such as described in the above-cited U.S. Pat. No. 4,728,042, wherein the dripper elements are individually fed to the extruder.

Each of the flow-reducer elements 11 comprises a short strip formed with a recessed formation which, when element 11 and the continuous strip 12 are bonded to the inner face of tube 10, defines an inlet chamber 13 at one end and formed with two inlet openings 14 communicating with the interior of the tube 10; an outlet chamber 15 at the opposite end formed with an outlet opening 16 through the tube 10; a labyrinth 17 in the form of a zigzag passageway serving as a flow-reducer path for the water passing from the inlet chamber 13 to the outlet chamber 15; and a connecting portion 18 formed with a connecting passageway 19 between the labyrinth 17 and the outer chamber 15.

As shown particularly in FIG. 1, the depths, from the inner face of tube 10, the inlet chamber 13, labyrinth 17, and outlet chamber 15 are substantially the same, but the depth of the connecting passageway 19 is somewhat shallower. It is to be understood that FIG. 1 (as well as the other figures illustrating other constructions as described below) shows the elements in their non-operating conditions when no water pressure is applied. Under operating conditions, when the flow-reducer elements are subject to the line pressure, the depth of the connecting passageway 19 is even more reduced by the deformation of connecting portion 18, as will be described below.

As shown particularly in FIG. 1b, the connecting portion 18 is formed of three sections, namely: an end section 18a adjacent to the labyrinth 17 and increasing in depth (from the inner face of tube 10) towards the outlet chamber 15; an end section 18b adjacent to the outlet chamber 15 and decreasing in depth towards the outlet chamber; and an intermediate section 18c of substantially uniform depth, which depth is less than that of the labyrinth 17, the outlet chamber 15, and the inlet chamber 13, as described earlier.

As further seen in FIG. 1b, the connecting passageway 19 in connecting portion 18 includes a wide groove 19a, substantially of the same width as the width of the two chamber 13 and 15 and the labyrinth 17, and a narrow groove 19b extending centrally through the three sections 18a, 18b, 18c of connecting section 18 and of larger depth (from the inner face of tube 10) than the wide groove 19a, but still of smaller depth than that of the two chambers 13, 15 and labyrinth 17.

In the embodiment illustrated in FIGS. 1, 1a and 1b, the complete strip 11, including its labyrinth 17 and connecting portion 18, is made of an elastomeric material, such as natural or synthetic rubber, thermoplastic elastomers (TPE), polyurethane, etc. The complete strip, particularly its connecting portion 18, is therefore deformable with pressure. Accordingly, when the water within the tube is under pressure, the connecting portion 18, is deflected towards the inner face of the tube, thereby closing the wide groove 19a. Accordingly, the narrow groove 19b will thereafter effect the regulation. When the water pressure is unduly high, the narrow groove 19b will be reduced in cross-sectional area, thereby reducing the flow to the outlet chamber; whereas when the water pressure is relatively low, the narrow groove 19b will increase in cross-sectional area, thereby increasing the flow rate.

In this manner, the connecting portion 18 of each flow-reducer element 11 imparts a flow-regulation characteristic to the element, tending to maintain a relatively constant rate of flow to the outlet chamber 15 and outlet opening 16 under varying line pressure conditions.

The FIG. 2 Embodiment

The drip irrigation line illustrated in FIGS. 2, 2a and 2b is of similar construction as that illustrated in FIGS. 1, 1a and 1b. Thus, the FIG. 2 construction also includes a tube 20 formed with a plurality of flow-reducer elements 21 spaced along its length bonded to a continuous, elongated strip 22, which latter strip is bonded to the inner face of the tube 20. Also in this construction, each flow-reducer element 21 is formed with a recessed formation defining, with the inner face of tube 20, an inlet chamber 23 formed with a pair of inlet openings 24; an outlet chamber 25 formed with an outlet opening 26; a labyrinth flow-reducer path 27; and a connecting portion 28 connecting the labyrinth to the outlet chamber.

The connecting portion 28 in the construction illustrated in FIGS. 2, 2a-2c is also formed with the two end sections 28a, 28b, an intermediate section 28c, the wide groove 29a, and narrow central groove 29b, as described above with respect to FIGS. 1, 1a and 1b. In the construction of FIGS. 2, 2a-2c, however, the narrow groove 29b is interrupted, and the interruption is bridged by a further groove 29c which is even narrower and of smaller depth (from the inner face of tube 20) than the two opposite ends of the narrow groove 29b. This construction makes the connecting portion 28 of each flow-reducer element 21 more sensitive to pressure variations since the flow control is more greatly concentrated at the center section 29c of the narrow groove 29b.

The FIG. 3 Embodiment

FIGS. 3 and 3a illustrate a drip irrigation line similar to that of FIGS. 1 and 2, including a tube 30, a plurality of flow-reducer elements 31 spaced along its length and bonded to a continuous elongated strip 32. Strip 32 includes a recessed formation which, when bonded to the inner face of the tube 30, also defines an inlet chamber 33 formed with a pair of inlet openings 34; an outlet chamber 35 formed with an outlet opening 36; a labyrinth flow-reducer path 37; and a connecting portion 38 formed with a passageway 39 connecting the labyrinth 37 to the outlet chamber 35. In the construction illustrated in FIG. 3, connecting portion 38 is also formed with two end sections 38a, 38b, and the intermediate section 38c of greatest depth (from the inner face of the tube) but smaller than the depth of either of the chambers 33, 36 or of the labyrinth 37.

In the construction illustrated in FIG. 3, however, the passageway defined by the connecting portion 38 includes but a single groove. Groove 39 is not of constant depth, but rather increases in depth from one edge to the opposite edge, as shown in FIG. 3a. Such a construction also provides relatively sensitive regulation of the flow rate under varying pressure conditions.

FIG. 3b, showing a section corresponding to that of FIG. 3a, illustrates a variation wherein the connecting passageway, therein designated 39', in the connecting portion 38', is formed with a bottom surface of concave curvature from one edge to the opposite edge, such that the depth is greatest at the midline between the two edges.

The FIG. 4 Embodiment

FIGS. 4, 4a and 4b illustrate a construction similar to that of FIGS. 1, 1a and 1b, except that only the connecting portion 48 of each flow-reducer element 41 is made of elastomeric material, the remainder of the element being made of a non-elastomeric plastic material, such as polyethylene or polypropylene. Another difference is that each of the flow-reducer elements 41 is applied directly (e.g., by plastic welding) to the inner face of the tube 40, rather than being first applied to a continuous strip, such as strip 12 in FIG. 1. Each flow-reducer element 41 is otherwise of the same construction as element 11 in FIG. 1, including a recessed formation defining, with the inner face of tube 40, an inlet chamber 43 formed with inlet openings 44, an outlet chamber 45 formed with an outlet opening 46, a labyrinth flow-reducer path 47, and connecting portion 48 formed with a connecting passageway 49 between the labyrinth and the outlet chamber.

Whereas the flow-reducer element 11 illustrated in FIG. 1 can be produced by a single-shot injection moulding process since the complete element is made of the same plastic material, in the construction illustrated in FIG. 4, the flow-reducer element 41 is made by a two-shot injection moulding process, but still using the same mould, as illustrated in FIGS. 4c and 4d. Thus, the first shot would be effected by injection moulding a non-elastomeric plastic material, such as polyethylene or polypropylene (FIG. 4c); and a few seconds thereafter, the elastomeric material defining the connecting portion 48 would be injected moulded, as shown in FIG. 4d, so as to be bonded to the non-elastomeric material. Since the construction illustrated in FIG. 4 does not utilize the continuous strip (12, FIG. 1), each of the flow-reducer elements 41 would be applied to the tube 40 at the time of extrusion if an extruded tube is produced, or to the face of the sheet used for making the tube if a seamed tube is produced.

The FIG. 5 Embodiment

FIGS. 5, 5a and 5b illustrate the construction of another flow-reducer element, therein designated 51, corresponding to the construction of FIGS. 2, 2a, 2b, but using elastomeric material only for the connecting portion 58 formed with the connecting passageway 59 between the flow-reducer labyrinth 57 and outlet chamber 55. The remainder of the flow-reducer element 51 is of non-elastomeric material, such as polyethylene or polypropylene, produced as described above with respect to FIG. 4. The connecting portion 58 of the flow-reducer element 51 in FIG. 5 is constructed in the same manner as described above with respect to FIG. 2, including the three sections 58a, 58b and 58c, and the three types of grooves 59a, 59b and 59c constituting the connecting passageway between the labyrinth 57 and outlet chamber 55.

The FIG. 6 Embodiment

FIGS. 6 and 6a illustrate a construction similar to that of FIG. 3, except that the continuous strip (22, FIG. 3) is not included, and the connecting portion 68 of the flow-reducer element 61 is formed of elastomeric material, whereas the remainder of the element is formed of non-elastomeric plastic material. The construction of the connecting passageway 69 in FIG. 6 is defined by a non-symmetrical groove, increasing in depth from one edge to the opposite edge, as described above with respect to FIGS. 3 and 3a, although the specific configuration of the groove in FIG. 6 is of S-shape.

While the invention has been described with respect to several preferred embodiments, it will be appreciated that these are set forth merely for purposes of example, and that many variations, modifications and applications of the invention may be made.

What is claimed is:

1. A drip irrigation line, comprising:
   a continuous tube having a plurality of flow-reducer elements spaced longitudinally of the tube;
   each of said flow-reducer elements comprising a strip formed with an inlet chamber of a predetermined depth at one end having an inlet opening, an outlet chamber of said predetermined depth at the opposite end having an outlet opening, and a flow-reducer path between said two chambers;
   said strip of each flow-reducer element being further formed with a connecting passageway, of a depth less than said predetermined depth, between, and axially spaced from, said flow-reducer path and said outlet chamber;
   said connecting passageway including a wide groove of a depth from the inner face of the tube less than that of said predetermined depth, and a narrow groove, of a depth from the inner face of the tube greater than that of said wide groove but less than that of said predetermined depth, extending through a part of said wide groove;
   at least the portion of the strip forming said connecting passageway being of elastomeric material.

2. The drip irrigation line according to claim 1, wherein the strip is of elastomeric material for the complete length of said flow-reducer path and of said connecting passageway.

3. The drip irrigation line according to claim 1, wherein the strip is of elastomeric material only for the length of said connecting passageway.

4. The drip irrigation line according to claim 1, wherein said narrow groove is formed with an interruption bridged by a further, narrower groove of a depth from the inner face of the tube greater than that of said wide groove but less than that of said narrow groove.

5. The drip irrigation line according to claim 1, wherein said connecting passageway includes a groove varying in depth from one edge to the opposite edge thereof.

6. The drip irrigation line according to claim 5, wherein the bottom of said groove is of curved configuration from one edge to the opposite edge thereof.

7. A drip irrigation line, comprising:
a continuous tube having a plurality of flow-reducer elements spaced longitudinally of the tube;
each of said flow-reducer elements comprising a strip formed with an inlet chamber of a predetermined depth at one end having an inlet opening, an outlet chamber of said predetermined depth at the opposite end having an outlet opening, and a flow-reducer path between said two chambers;
said strip of each flow-reducer element being further formed with a connecting passageway, of a depth less than said predetermined depth, between, and axially spaced from, said flow-reducer path and said outlet chamber;
at least the portion of the strip forming said connecting passageway being of elastomeric material;
said flow-reducer elements being separate, discrete strips bonded at spaced intervals to a continuous, elongated, flexible element which is in turn bonded to one surface of said tube.

8. The drip irrigation line according to claim 7, wherein said continuous, elongated, flexible element is of higher mechanical strength than the flow-reducer elements.

9. The drip irrigation line according to claim 1, wherein said flow-reducer elements are separate, discrete strips bonded at spaced intervals to one face of said tube.

10. A drip irrigation line, comprising:
a continuous tube having a plurality of flow-reducer elements spaced longitudinally of the tube;
each of said flow-reducer elements comprising a strip of elastomeric material formed with an inlet chamber of a predetermined depth at one end having an inlet opening, an outlet chamber of said predetermined depth at the opposite end having an outlet opening, a labyrinth-type flow-reducer path of said predetermined depth between said two chambers, and a connecting passageway, of a depth less than said predetermined depth, between, and axially spaced from, said flow-reducer path and said outlet chamber;
said connecting passageway including a wide groove of a depth from the inner face of the tube less than that of said predetermined depth, and a narrow groove, of a depth from the inner face of the tube greater than that of said wide groove but less than that of said predetermined depth, extending through a part of said wide groove.

11. The drip irrigation line according to claim 10, wherein said narrow groove is formed with an interruption bridged by a further, narrower groove of a depth from the inner face of the tube greater than that of said wide groove but less than that of said narrow groove.

12. The drip irrigation line according to claim 10, wherein said connecting passageway includes a groove varying in depth from one edge to the opposite edge thereof.

13. The drip irrigation line according to claim 12, wherein the bottom of said groove is of curved configuration from one edge to the opposite edge thereof.

14. The drip irrigation line according to claim 10, wherein said flow-reducer elements are separate, discrete strips bonded at spaced intervals to a continuous, elongated, flexible element which is in turn bonded to one surface of said tube.

15. The drip irrigation line according to claim 14, wherein said continuous, elongated, flexible element is of higher mechanical strength than the flow-reducer elements.

16. The drip irrigation line according to claim 10, wherein said flow-reducer elements are separate, discrete strips bonded at spaced intervals to one face of said tube.

17. The method of making a flow-reducer element by injection-moulding, characterized in that a plurality of different materials are injection-moulded during separate shots in a single mould, at least one of which materials is an elastomeric material to effect regulation of the dripper during its operation.

* * * * *